No. 790,942. PATENTED MAY 30, 1905.
J. E. WEAVER.
ELECTRIC POWER SYSTEM.
APPLICATION FILED OCT. 21, 1904.
3 SHEETS—SHEET 2.
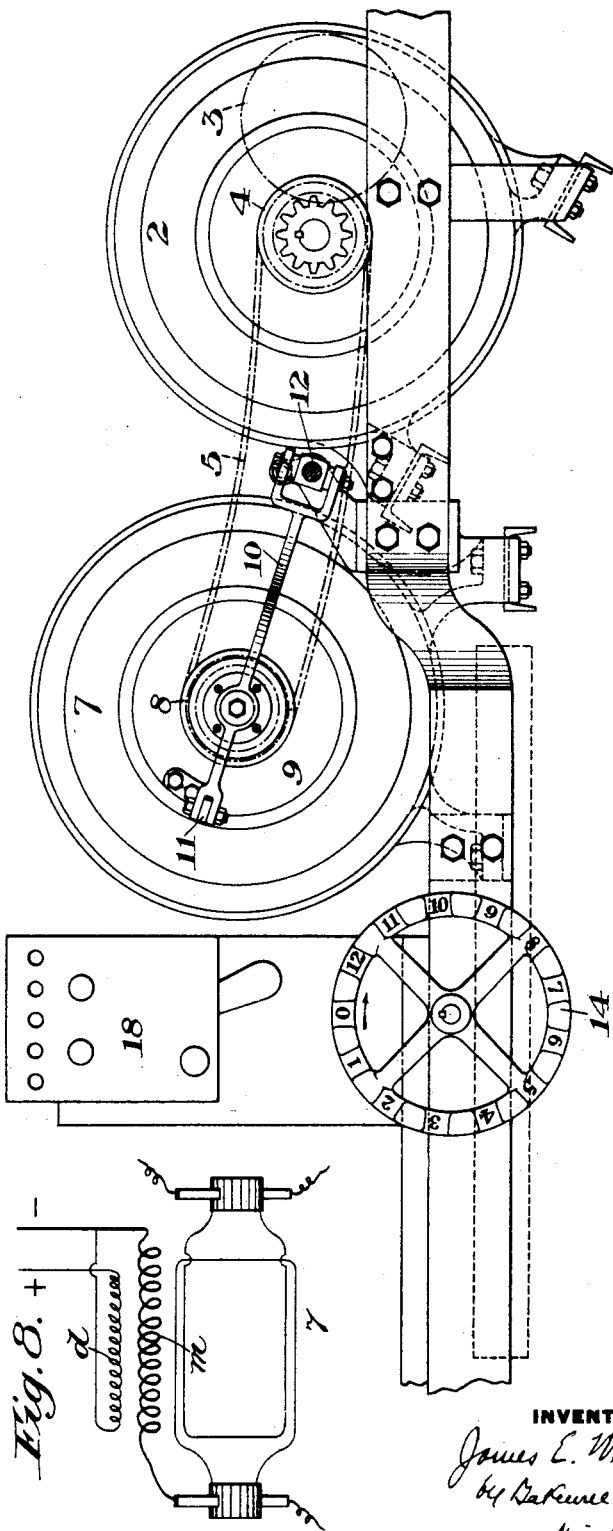
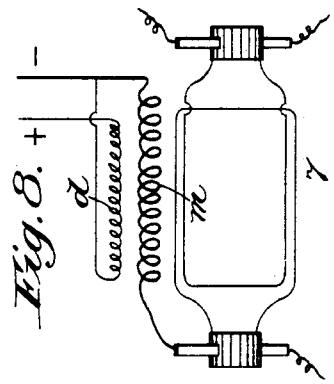
WITNESSES
INVENTOR

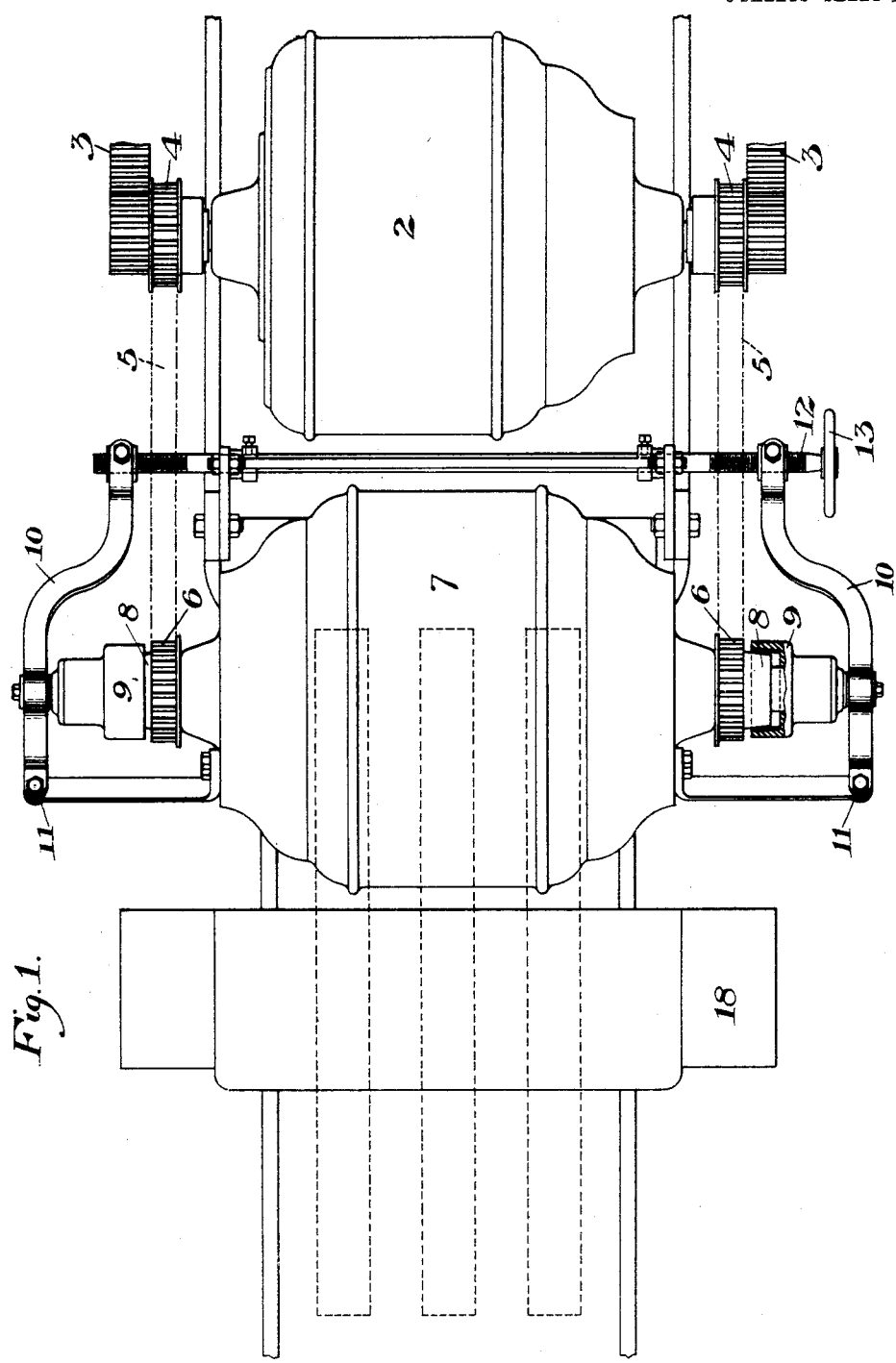

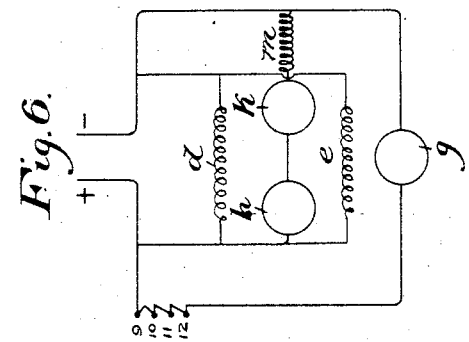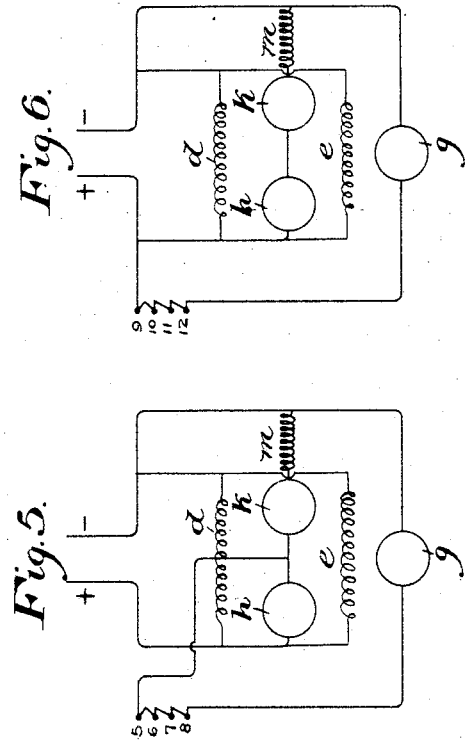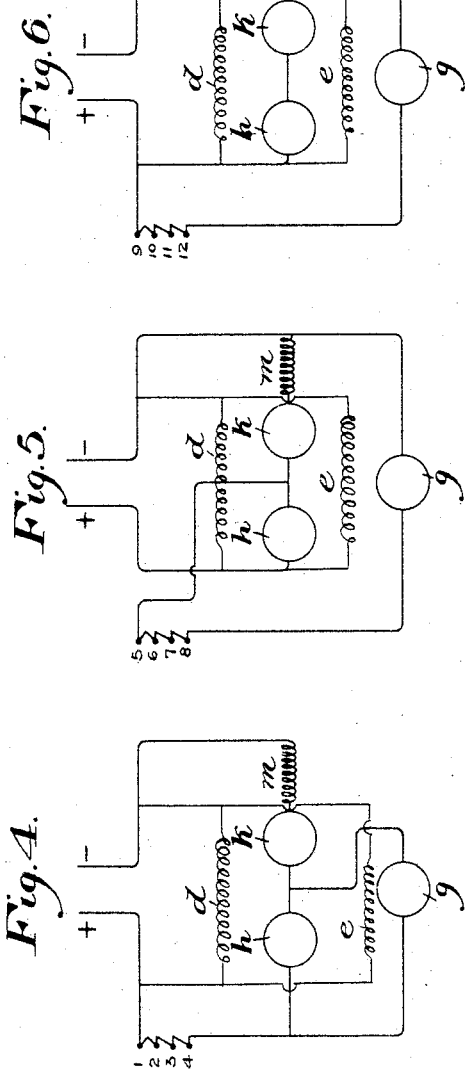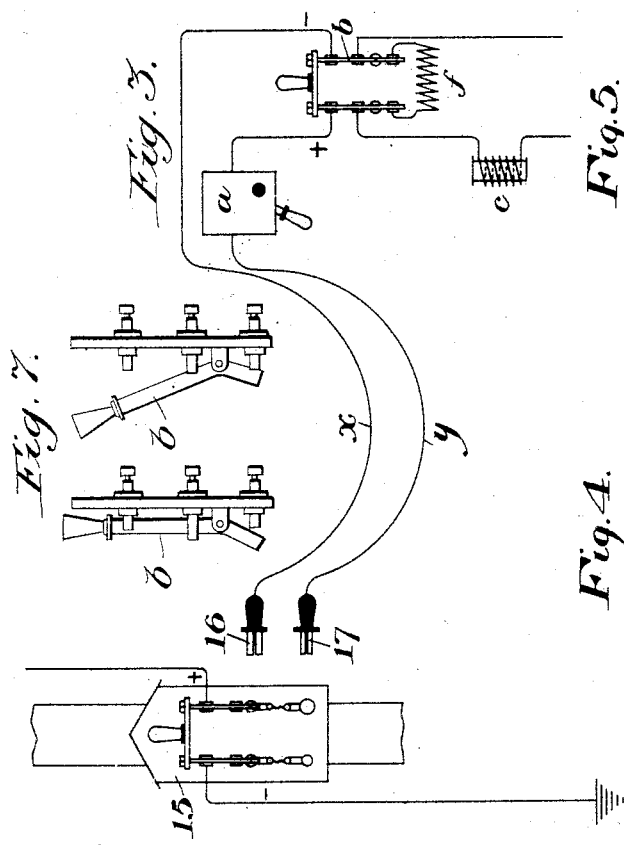

No. 790,942.

Patented May 30, 1905.

UNITED STATES PATENT OFFICE.

JAMES E. WEAVER, OF ALLEGHENY, PENNSYLVANIA, ASSIGNOR TO THE WEAVER ELECTRIC FIRE ENGINE COMPANY, OF PITTSBURG, PENNSYLVANIA, A CORPORATION OF COLORADO.

ELECTRIC-POWER SYSTEM.

SPECIFICATION forming part of Letters Patent No. 790,942, dated May 30, 1905.

Application filed October 21, 1904. Serial No. 229,420.

*To all whom it may concern:*

Be it known that I, JAMES E. WEAVER, of Allegheny, Allegheny county, Pennsylvania, have invented a new and useful Electric-Power System, of which the following is a full, clear, and exact description, reference being had to the accompanying drawings, forming part of this specification, in which—

Figure 1 is a top plan view showing motors arranged and connected in accordance with my invention. Fig. 2 is an end elevation of the same. Fig. 3 is a diagrammatic view of the connections. Figs. 4, 5, and 6 are diagrams illustrating the different arrangements of the multiple-motor arrangement. Fig. 7 is a side elevation of the main switch in two positions, and Fig. 8 is a diagrammatic view of my double-commutator compound-wound machine.

My invention relates to the class of electric-power systems wherein a plurality of electric motors are employed, and is especially designed for the use of electric motors upon portable fire-engines, though the system may be used in other connections.

The object of my invention is to provide a new arrangement of motors whereby two motors may be built up to substantially the same speed and then mechanically coupled together. In my system one motor is preferably permanently connected to the pump or other device to be operated and is therefore under the load at all times, while the other motor may be mechanically connected or disconnected by means of the clutch.

In the drawings, in which I show a portion of a fire-engine constructed in accordance with my invention, 2 is the rear electric motor, preferably having direct gearing with the pump or other device to be driven, as indicated at 3 3. This motor 2 is preferably a shunt-wound machine of the inclosed type. Its shaft is provided with pinions 4 4, connected by driving-chains 5 with toothed wheels 6, loosely mounted upon the shaft of the front motor 7. This motor 7 is preferably a double-commutator machine having a compound field. The toothed wheels 6 are provided with the inner cone members 8 of friction-clutches, the outer members 9 of which are secured to the armature-shaft by a spline connection, which allows them to be slid endwise of this shaft. The outer clutch members are moved into and out of engagement with the inner clutch members by means of levers 10, pivoted to brackets at 11 and actuated by a shaft 12, having right and left hand screw-threads which engage corresponding screw-threads in collars secured to the levers. The shaft 12 is actuated by hand-wheel 13, so that by turning this hand-wheel the friction-clutches may be moved into or out of engagement to mechanically connect or disconnect the motors. The friction-clutches as they are screwed into engagement will compensate for a slight variation in the speed of the motors at the time when they are mechanically coupled, so that they will be brought to the same speed and run in tandem, thus giving the full power of both motors on the pump. By arranging the motors in tandem I am enabled to use narrow trucks, which especially adapt my fire-engines to the narrow streets and congested thoroughfares of a city.

The motors in the preferred form are twenty-five-horse-power motors, each wound for five hundred volts, the rear motor being a shunt-wound motor, while the front motor is a double-commutator compound-wound machine, one end of the armature being wound for one hundred and sixty-seven volts and the other for three hundred and thirty-three volts. The advantage of using this compound-wound machine in connection with the five-hundred-volt shunt-wound machine is that the compound machine tends to maintain a constant current and voltage through the shunt-wound machine under different loads. In the compound machine a change of load and speed will change the strength of the series fields $m$, so that on an increased load with decreased speed the strength of the field will be increased and the "back-voltage" effect will be substantially uniform.

A controller of the ordinary street-car type is mounted transversely under the driver's seat and is operated by the hand-wheel 14.

This hand-wheel is spaced off into twelve spaces, marked from "0" to "12," respectively, so that the operator can move the drum-controller to the successive notches or steps. The electrical connections are illustrated in the general diagram of Fig. 3. In this diagram 15 is a feed-box having two different-sized holes to receive the different-sized plugs 16 and 17, carried on the engines and connected to the lines $x$ and $y$, which are respectively the ground-line and the feed-line. The plugs are of different size in order to prevent the operator from inserting them in the wrong holes, thereby preventing any change of polarity in inserting the plugs. The feed-line $y$ passes to the circuit-breaker $a$, which is placed at the right hand of the driver's seat in the form shown, the feed thence extending to the main switch $b$. The other line $y$ leads through the magnetic blow-out coil $c$ and thence to the controller connections in which the various developments shown in Figs. 4, 5, and 6 are obtained. The main switch $b$ is of a special type, being made with extended blades set at an angle from the hinged point in such a manner as to insert in two clips just as main blades are about to leave the two lower clips on the main part of the switch, as shown in Fig. 7. This construction is used in order to protect the shunt-field, from which there is a very heavy self-induction or "back kick." By connecting these fields (shown at $d$ and $e$) across the two lower clips in the main part of the switch, as shown, and by connecting the two extended clips through a special bank of resistance (shown at $f$) this self-induced current is thereby diverted and choked by the resistance which holds it down to the point where there is no danger of burning out the fields.

During the first four steps or notches of the controller in starting the five-hundred-volt motor and the three-hundred-and-thirty-three-volt end of the compound motor are in multiple series with the one-hundred-and-sixty-seven-volt end of the first motor.

In Fig. 4, $g$ represents the five-hundred-volt machine, $h$ the three-hundred-and-thirty-three-volt end, and $k$ the one-hundred-and-sixty-seven-volt end of the compound motor. The points marked "1," "2," "3," and "4" are resistances in the line leading to the motors. In this position both motors rotate through all the steps, and in these first four steps the one-hundred-and-sixty-seven-volt end of the compound machine acts as resistance to assist the line resistance. As the wheel is moved through these four steps the motors get under headway and build up. At the fifth step the connections change to the diagram shown in Fig. 5, which illustrates the steps from "5" to "8." During these steps the five-hundred-volt motor is in series with the three-hundred-and-thirty-three-volt end of the other motor, while the one-hundred-and-sixty-seven-volt end is generating counter electromotive force, which tends to oppose the line-current and have a choking effect upon it. This counter electromotive force or back voltage also acts to reinforce the current passing to the five-hundred-volt machine and assists the resistance in controlling it. The resistance is therefore merely to give a finer adjustment, the rough adjustment being accomplished by changing the connections, and thereby utilizing the counter electromotive force of the one-hundred-and-sixty-seven-volt machine. During the steps "5" to "8," as marked on Fig. 5, the compound machine is at full speed and power; but the five-hundred-volt machine has not reached its capacity in speed, although through steps "5" to "8" it is capable of delivering its full capacity of twenty-five-horse power. It will be noted that by the peculiar system of connections used each motor is capable of giving off its full horse-power while the speed is below the normal capacity. At the ninth step the connections change to the form shown in Fig. 6. With these connections from "9" to "12" the two motors are not mechanically connected, nor are they electrically connected. They work as two independent motors on the same line. These last steps are used to build up a five-hundred-volt motor to its full speed before the two motors are mechanically connected. At the twelfth step the five-hundred-volt motor is brought up to full speed. The motors are then ready for mechanically connecting, and the friction-clutches may then be thrown in. As the clutches are moved into engagement the compound motor, which is moving at a slightly greater speed than the shunt-motor, will be brought down to the speed of the shunt-motor. This decrease of speed in the compound motor will increase the strength of its fields, the friction-clutch being thrown in gradually to allow the speed to be gradually reduced until it is running at the same speed as the shunt-wound machine. The load is equalized by the mechanical connections, each motor taking its own share of the load.

In starting the motors the operator moves the wheel successively through steps "1" to "4," giving a slow speed and low pressure on the pumps. Through the remaining steps the operator can run for an indefinite period at any notch except through steps "9," "10," and "11," which, as before stated, are merely for building up the motors to the point where they can be mechanically connected to give the full power of the engine. The small amount of resistance used is of the spool type and is placed longitudinally of the vehicle in a box 18 underneath the footboard and running back below the driver's seat. These spools are arranged parallel to each other. The controller is provided with an annular blow-out of ordinary type, which serves to extinguish any sparking or flashing in the controller.

At the left hand of the driver's seat and over the hand-wheel 14 is placed a box 18, containing an overload-circuit breaker of ordinary type, which will cut off the current from both machines whenever it is increased beyond a predetermined point from any cause, such as grounding, short circuit, overloads, &c. This box also contains a push-button by which the operator can instantly cut off the current from the line and stop the motors by merely striking the projecting knob.

The peculiar arrangement of the motors and connections gives an economy in weight, in space, and in current consumption. The weight of the entire electric equipment is about three thousand pounds, whereas with other systems the weight would be largely increased, as would also the amount of resistance used, the amount or space occupied, and current consumed and without the advantage of affording large variations in speed which may be produced by the arrangement shown.

The feeder-boxes are to be provided near the water-plugs in the district where the engine is to be used. This box is under lock and key and contains the main switch connected to the plug devices to receive the plugs carried on the engine.

The engine is wired throughout for electric lights to provide for inspection of the different parts.

In starting the engine the operator opens the feeder-box, inserts the plugs, closes the main switch and circuit-breaker, and is ready to start. This may be done in a few seconds while another operator is connecting the hose. The wheel 14 is then turned through the successive notches to the point desired, the pumps being arranged at this time so that they are merely operating in a closed circuit. If high pressure is desired, the wheel is turned to the twelfth notch and the friction-clutches then thrown in.

The advantages of my invention result from the peculiar arrangement of the electric motors. With this arrangement of the electric motors I am enabled to use the full horse-power of both motors by coupling them together mechanically, while providing for different speeds with one or both motors. The system differs from the ordinary street-car system, where the motors are not mechanically connected, and also from the multiple-voltage system in which four motors are used. By my peculiar combination of the multiple-voltage system with the series-parallel system I obtain a better control with a small amount of resistance, so that the system may be placed upon a vehicle such as a fire-engine. The resistance is simple to give the finer graduation between the successive steps.

Many variations may be made in the form and arrangement of the motors and connections without departing from my invention.

I claim—

1. In an electric-power-transmission mechanism, a plurality of electric motors, a permanent driving connection between one motor and the device to be driven, the other motor being a compound-wound double-commutator machine, connections for changing the relation between the commutator of the first motor and those of the double-commutator machine, and a friction-clutch arranged to mechanically couple or uncouple the electric motors; substantially as described.

2. In an electric-power-transmission mechanism, a plurality of electric motors, a permanent driving connection between one of the motors and the element to be driven, means for varying the electrical connections of said motors, and means for mechanically coupling and uncoupling the motors to and from each other; substantially as described.

3. In an electric-power-transmission mechanism, a plurality of electric motors, one of which is a shunt-wound motor having permanent driving connection with the element to be driven, another being a compound-wound double-commutator machine, means for mechanically coupling the motors to and uncoupling them from each other, and means for varying their electrical connections; substantially as described.

4. In an electric-power-transmission mechanism, a pair of electric motors arranged in tandem with their shafts in parallelism, a clutch device arranged to mechanically couple and uncouple the motors, and a pump or element to be driven connected to at least one of said motors; substantially as described.

5. In an electric-power-transmission mechanism, a pair of electric motors arranged in tandem with their shafts in parallelism, a clutch device arranged to mechanically couple and uncouple the motors, and a pump or element to be driven connected to one only of said motors; substantially as described.

6. In an electric-power-transmission mechanism, a pump, a plurality of electric motors arranged in tandem with their shafts in parallelism, one of said motors having actuating connections with the pump, and a friction-clutch arranged to mechanically couple and uncouple the motors to and from each other; substantially as described.

7. In an electric-power-transmission mechanism, a plurality of electric motors, a pump or element to be driven connected to one of said motors, means for building up the motors to drive them at substantially the same speed, and means for coupling and uncoupling the motors to and from each other; substantially as described.

8. In an electric-power-transmission mechanism, a plurality of electric motors, a pump or element to be driven connected to one of said motors, means for building up the motors to drive them at substantially the same speed, means for coupling and uncoupling the motors to and from each other, and means for varying the electrical connections of said motors; substantially as described.

9. In an electric-power-transmission mechanism, a pair of motors arranged in tandem with their axes in parallelism, a pump or element to be driven having actuating connections with one of said motors, means for varying the electrical connections of said motors and building them up to the same speed, and means for mechanically connecting and disconnecting the motor-shafts; substantially as described.

10. A fire-engine having a plurality of electric motors mounted thereon, one of said motors being a compound-wound double-commutator machine, pumps having actuating connections with the other motor, and a controller arranged to place said other motor and one part of the compound motor in multiple series with the other part of the compound motor, and also arranged to connect them as two independent motors on the same line, substantially as described.

11. A fire-engine having a compound-wound double-commutator motor and another motor, pumps having driving connections with the second motor, a commutator arranged to shift the electric connections and allow the other motor to build up, and means for mechanically coupling up the motors together; substantially as described.

12. A fire-engine having a plurality of electric motors mounted thereon, pumps having driving connections with one of said motors, electrical connections between the motors, the other motor being a compound-wound double-commutator machine, and a controller arranged to shift the electrical connections for the motor to vary the power, the compound motor acting as a booster; substantially as described.

13. A fire-engine having a plurality of electric motors mounted thereon, pumps having actuating connections with one of said motors, the motors being electrically connected, and the second motor having a compound winding and a double commutator; substantially as described.

14. An electric engine having a plurality of motors, one of which is a compound-wound double-commutator machine arranged to act as a booster, resistance arranged to give a finer adjustment between the motors, and a drum-controller arranged to vary the connections; substantially as described.

15. An electric fire-engine having a plurality of motors, one of which is mechanically connected with the pump, the other being a compound-wound double-commutator machine, connections for changing the relation between the commutator of the first motor and those of the double-commutator machine, and a clutch device arranged to mechanically connect two motors; substantially as described.

In testimony whereof I have hereunto set my hand.

JAMES E. WEAVER.

Witnesses:
JOHN MILLER,
H. M. CORWIN.